United States Patent [19]

Milton

[11] Patent Number: 5,800,117
[45] Date of Patent: Sep. 1, 1998

[54] TANK LIFTING AND TRANSPORT APPARATUS

[76] Inventor: George F. Milton, 86 Machelle Dr., Jacksonville, Fla. 32220

[21] Appl. No.: 710,351

[22] Filed: Sep. 17, 1996

[51] Int. Cl.[6] .................................................. B66C 23/00
[52] U.S. Cl. .................... 414/540; 414/543; 280/656; 254/4 R
[58] Field of Search .............................. 280/491.1, 401, 280/638, 656; 180/208, 908, 905, 906; 414/539, 540, 541, 542, 543; 254/4 R

[56] References Cited

U.S. PATENT DOCUMENTS

| 2,801,864 | 8/1957 | Raney et al. | 280/656 X |
|---|---|---|---|
| 4,128,258 | 12/1978 | Johnson | 280/656 |
| 4,412,699 | 11/1983 | Peruzzi | 280/656 X |
| 5,249,823 | 10/1993 | McCoy et al. | 280/656 |
| 5,423,652 | 6/1995 | Thiede | 414/543 |

FOREIGN PATENT DOCUMENTS 3204928  8/1983  Germany ................ 414/783

*Primary Examiner*—Frank E. Werner
*Attorney, Agent, or Firm*—Thomas C. Saitta

[57] ABSTRACT

A lifting and transport apparatus for moving a storage tank having a pair of longitudinal frame members, preferably expandable in length, releasably connected to a pair of lateral frame members, also preferably expandable in length, which are joined to form a generally rectangular frame around the storage tank, the lateral frame members being mounted on a pair of wheeled end members with a winch mounting means on both end members, such that a winch can be used to raise one end of a tank above the longitudinal frame members, a cross member inserted, the first end then lowered onto the cross member, the winch removed and positioned on the opposite end member, the second end of the tank raised, a second cross member inserted, and the tank then lowered into a raised horizontal position for transport to a new location, where it is placed on the ground or into a hole by reversing the steps.

10 Claims, 4 Drawing Sheets

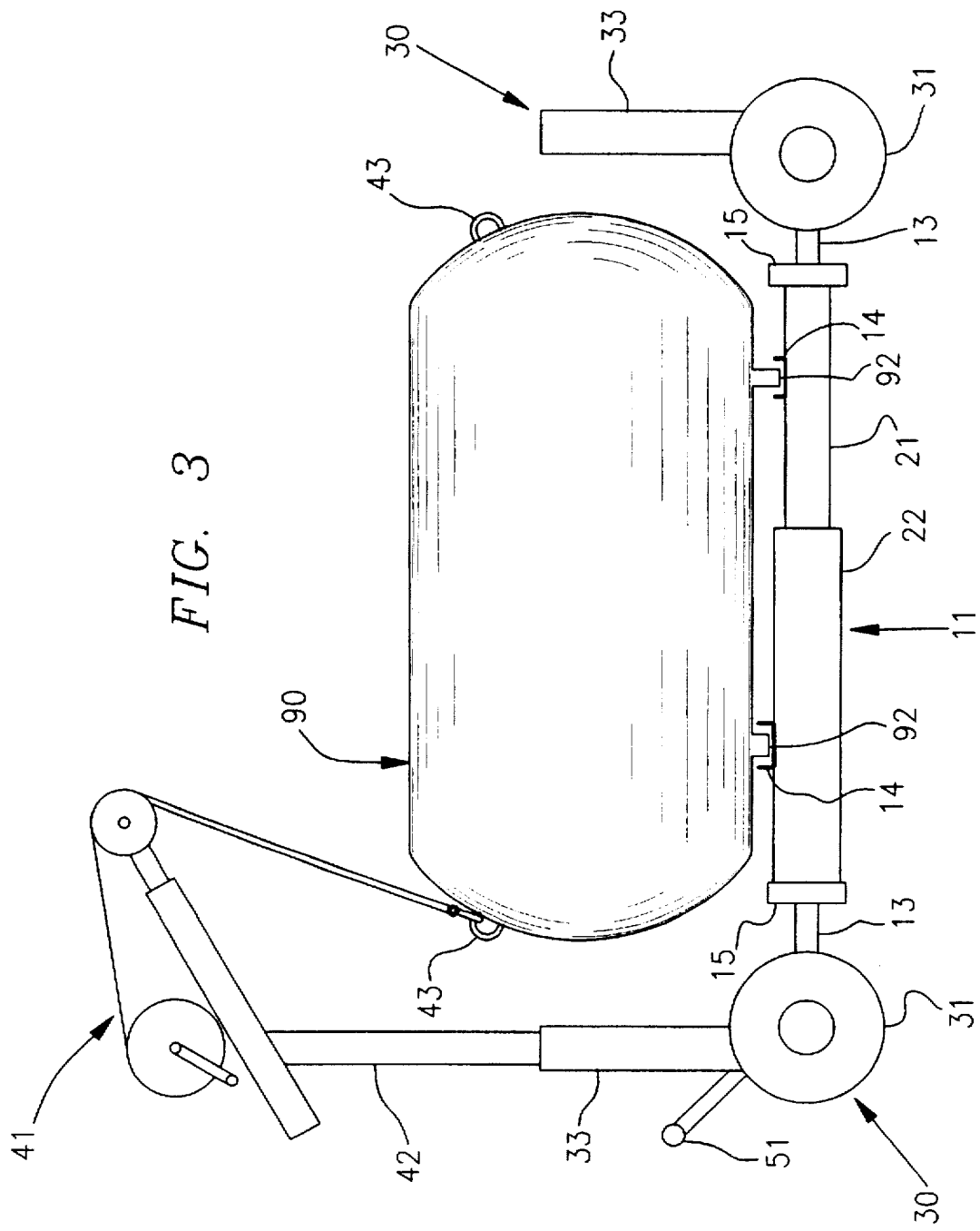

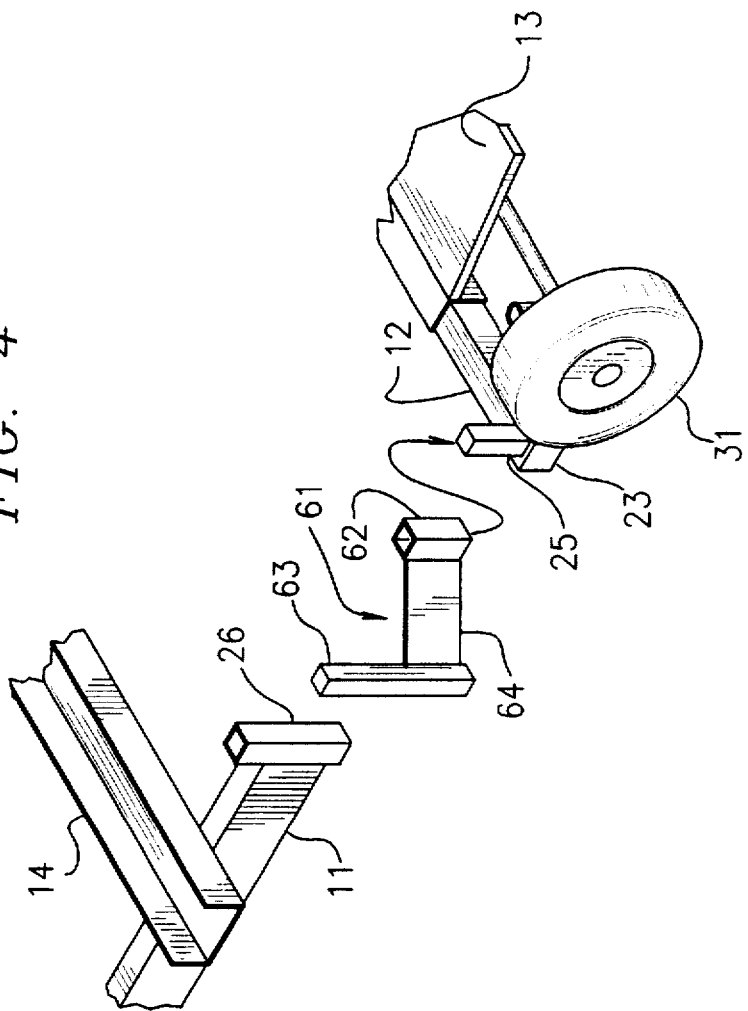

TANK LIFTING AND TRANSPORT APPARATUS

BACKGROUND OF THE INVENTION

This invention relates generally to the field of lifting and transporting devices used to move storage tanks. More particularly, the invention relates to such devices which are adaptable for various size tanks, which can be assembled and disassembled in position around a tank, and which allow the tank to be raised, moved and lowered by hand operation.

Large, ground-seated storage tanks for gasoline, kerosene, propane or the like typically range in capacity between 120 to 500 gallons and range in size with a diameter between 24 and 36 inches and a length between 80 and 120 inches. Situations often arise where a tank needs to be moved. Large lifting devices, such as winch trucks or the like can often be used, but sometimes the tanks are positioned near obstructing elements such as fences or buildings, precluding access to the larger devices. There is a need therefore, for an apparatus capable of raising and transporting tanks where the apparatus is able to be used in obstructed locations. There is a further need for such an apparatus which is simple in construction, which can be assembled and disassembled in position around the tank, which can be hand operated in both the lifting and the moving phase, which can lower the tank into a hole or recess if necessary, and which can roll in any direction. It is an object of this invention to provide such an apparatus meeting all the above described needs.

SUMMARY OF THE INVENTION

The invention is in general an apparatus for lifting and transporting liquid or gas storage tanks or similar elongated objects, the apparatus comprising means to raise the tank from the ground, means to support the tank on the apparatus, means which enable the apparatus to be moved with the tank in the supported position, and means to lower the tank to the ground or into a hole in the ground at a chosen location. More particularly, the invention comprises a generally rectangular wheeled frame having detachable, preferably expandable in length, lateral and longitudinal members which can be assembled in place surrounding the tank to be moved, winch means to raise and lower the tank, where the winch means can be positioned at either end of the frame, and cross member means to support the tank on the frame member during transport.

The longitudinal members are each preferably expandable, preferably in a telescoping manner with an inner member and outer sleeve member. The lateral members are connected to the wheels by suitably strong brace members, and the lateral members are also each preferably expandable, preferably in telescoping manner, such that the rectangular frame can be properly dimensioned as required for any particular tank. Alternatively, the dimensions of the rectangular frame can be altered where non-expandable longitudinal and lateral members are used by providing fixed length extender members which are mounted onto connector means. The longitudinal members are easily and readily detachable from the lateral members, such that the frame can be constructed and disassembled around the tank with the tank situated on the ground. Longitudinal members and lateral members are temporarily joined by any suitable releasable or detachable connector means, such as for example a combination of pin and sleeve. Removable cross members are positioned laterally across the longitudinal frame members after the tank has been raised to provide support means for the tank when it is lowered for transport. When the tank is raised and the cross members removed, the area beneath the tank is unobstructed, enabling the tank to be lowered directly to the ground or even into a hole.

Dual winches may be provided, one at each end, or the end members may comprise winch mounting means which enable a single winch to be used to raise each end of the tank successively. The winches may utilize cable, rope or strap mounted hooks adapted to fit into rings attached to the tank, or large straps which are looped around the main body of the tank. To use the apparatus with a single winch, the first end of the tank is raised above the frame and a first cross member inserted to support this first end. Then this end of the tank is lowered onto the cross member, the winch removed from the first mounting means and placed in the other mounting means at the opposite end of the apparatus. The other end of the tank is then raised, the second cross member inserted and the tank lowered to rest in a generally horizontal position on both support cross members. The wheels on the apparatus are preferably mounted with castor type mounts so that they can swivel in any direction. This allows the apparatus, even when loaded, to be easily maneuvered in any direction. Handle means are either permanently or temporarily mounted to one or both ends of the apparatus.

BRIEF DESCRIPTION OF THE DRAWINGS

FIG. 3 is a side view of the invention, showing the tank fully supported by the cross members.

FIG. 4 is a partial view of the invention showing one of the extender means.

DETAILED DESCRIPTION OF THE INVENTION

Figure 1:
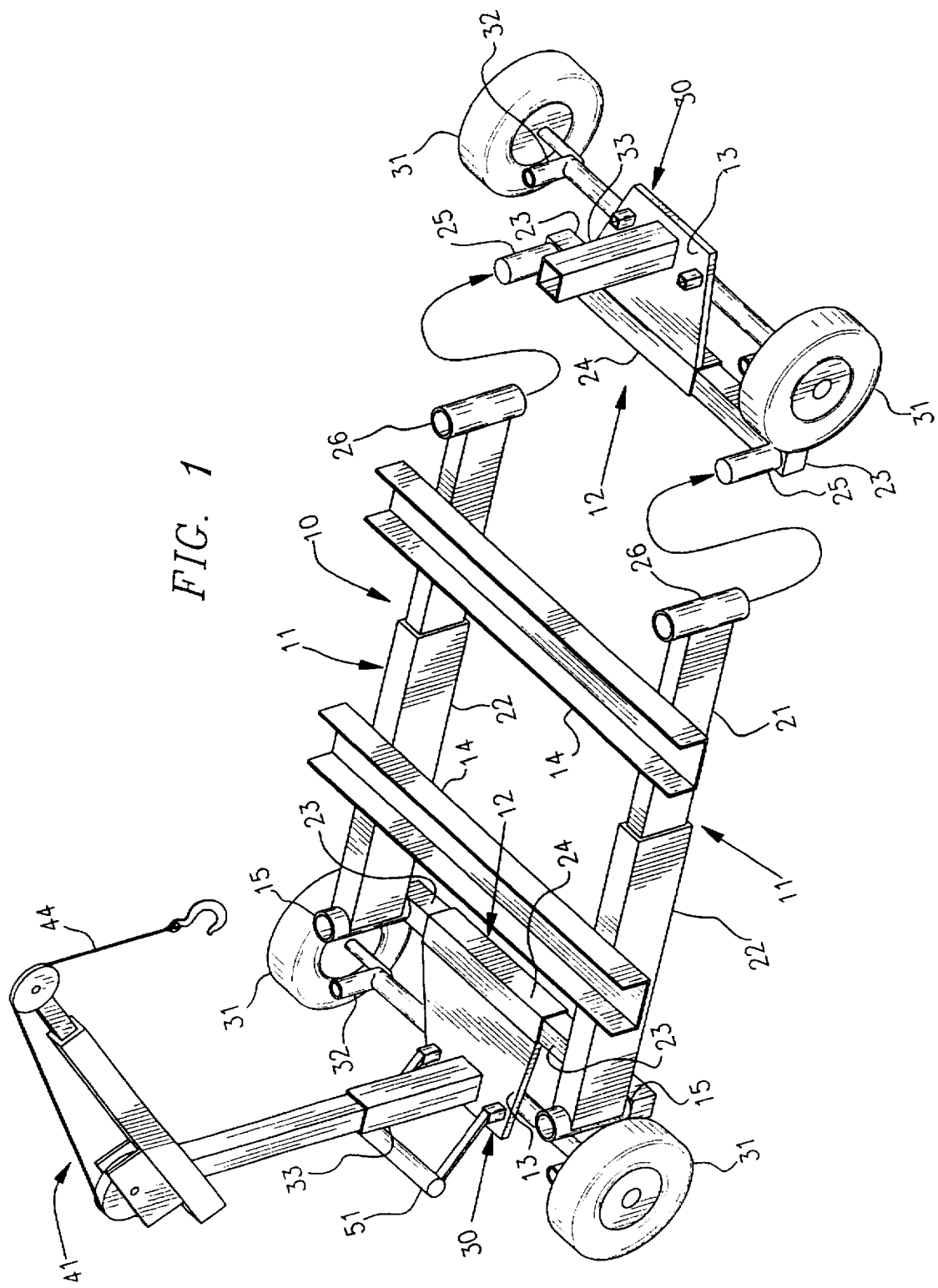
FIG. 1 is a perspective view of the invention, partially disassembled.

With reference now to the drawings, the invention will be described in detail with regard to the best mode and preferred embodiment. The invention is an apparatus for lifting, transporting and lowering liquid or gas storage tanks or similar type objects. The invention is in general a wheeled trailer or cart-type apparatus constructed of material, such as steel or the like, capable of supporting a large amount of weight during movement from one location to another, which can be moved by hand or motorized vehicle means. The invention is adaptable to tanks of different sizes and dimensions, and can be used to lift, move and relocate tanks in locations which are not easily accessible. The apparatus generally comprises a frame 10 comprised of readily detachable longitudinal frame members 11 and end members 30 having lateral frame members 12, where the longitudinal frame members 11 and lateral frame members 12 are joined by connector means 15 to form a generally rectangular configuration. The end members 30 have wheels 31, preferably with castor type mounting means 32, winch mounting means 33 to receive a winch 41, and at least one handle means 51.

Referring now to FIG. 1, it is seen that the frame 10 is formed in a generally rectangular configuration by connecting a pair of longitudinal frame members 11 to a pair of lateral frame members 12. The joining is accomplished by releasable connector means 15, such that the longitudinal frame members 11 are easily and readily connected and disconnected from the lateral frame members 12. When in the assembled configuration, the frame 10 is capable of supporting a large weight such as a storage tank 90. The frame members 11 and 12 may be composed of any suitable material having sufficient strength, such as square steel tubing or the like. The connector means 15 may be of any suitable design which allows simple assembly and disassembly of the frame 10, such as for example a combination of vertically oriented pins 25 and sleeves 26 as shown. While longitudinal frame members 11 and lateral frame members 12 may be of fixed lengths, it is preferable that they be extendable or expandable to accommodate tanks 90 of various dimensions. For example, standard tanks 90 vary in length from 80 to 120 inches and vary in diameter from 24 to 36 inches. The longitudinal frame members 11 are thus each preferably constructed to act in a sliding or telescoping manner by providing an inner sliding member 21 retained within an outer sleeve member 22. The lateral frame members are each preferably constructed with an outer sleeve member 24 connected to the end member 30 brace members 13, with a pair of inner sliding members 23. With this construction, the frame 10 can be expanded or retracted both longitudinally and laterally as required.

An alternative construction which allows the dimensions of the rectangular frame 10 to be altered where fixed length, non-extendable longitudinal and lateral frame members 11 and 12 are used is illustrated in FIG. 4, which shows the addition of extender members 61 as an element of the releasable connector means 15. Extender member 61 has an extender sleeve 62 adapted to connectably and removably mate with pin 25 on lateral members 12, and has an extender pin 63 adapted to connectably and removably mate with sleeve 24 on longitudinal members 11, with a brace member 64 connecting the two. Preferably the connector means 15 and the extender pins and sleeves 63 and 62 are non-circular in cross-section so that the extender member 61 will not rotate when in position. The extender members 61 may be constructed such that the brace member 64 extends parallel, perpendicular or at an angle to either of the frame members 11 and 12.

The wheels 31 are connected to the lateral frame members 12 by frame brace members 13 which are of any suitable design providing sufficient strength between the components. The wheels 31 are preferably generally large and wide, with suitable density or air compression, in order to make it easier to move the invention when loaded. Most preferably, the wheels 31 are mounted on castor-type mounting means 32 which enable the wheels 31 to turn or swivel in any direction. This allows the invention to be moved in any direction—forward, backward, or sideways, and in a straight or curved line—since in many instances a tank 90 may be accessible from only one direction, or the desired location for placement of the tank 90 may have restricted access. Handle means 51 is also preferably provided for movement of the invention, which most preferably is detachable and attachable to either end member 30.

The end members 30 each have a winch mounting means 33, which may consist of a sleeve 34 as shown. Preferably, the winch mounting means 33 allows a winch 41 to be removed and replaced, thus enabling a single winch 41 to be utilized in raising and lowering a tank 90. The winch 41 is mounted into winch mounting means 33 by winch post 42. The winch 41 may be of any type capable of lifting the weight of large storage tanks 90, and may be hand or machine powered. The winch 41 may utilize a cable and hook combination 44 attachable to tank attachment means 91 as shown, or may use rope, chain or even straps which encircle the body of the tank 90.

At least two removable support cross members 14 are provided, the support cross members 14 being of sufficient length to span the open area between the two longitudinal frame members 11 in the most expanded lateral position. The cross members 14 are constructed to be positionable at any point along the length of the longitudinal members 11, such that they may each be correctly aligned directly beneath each tank foot 92 if such are present. The cross members 14 are preferably constructed with a U-shaped profile in order to best retain the tank feet 92, and must be made of sufficiently strong material to support the weight of the tank 90.

Figure 2:
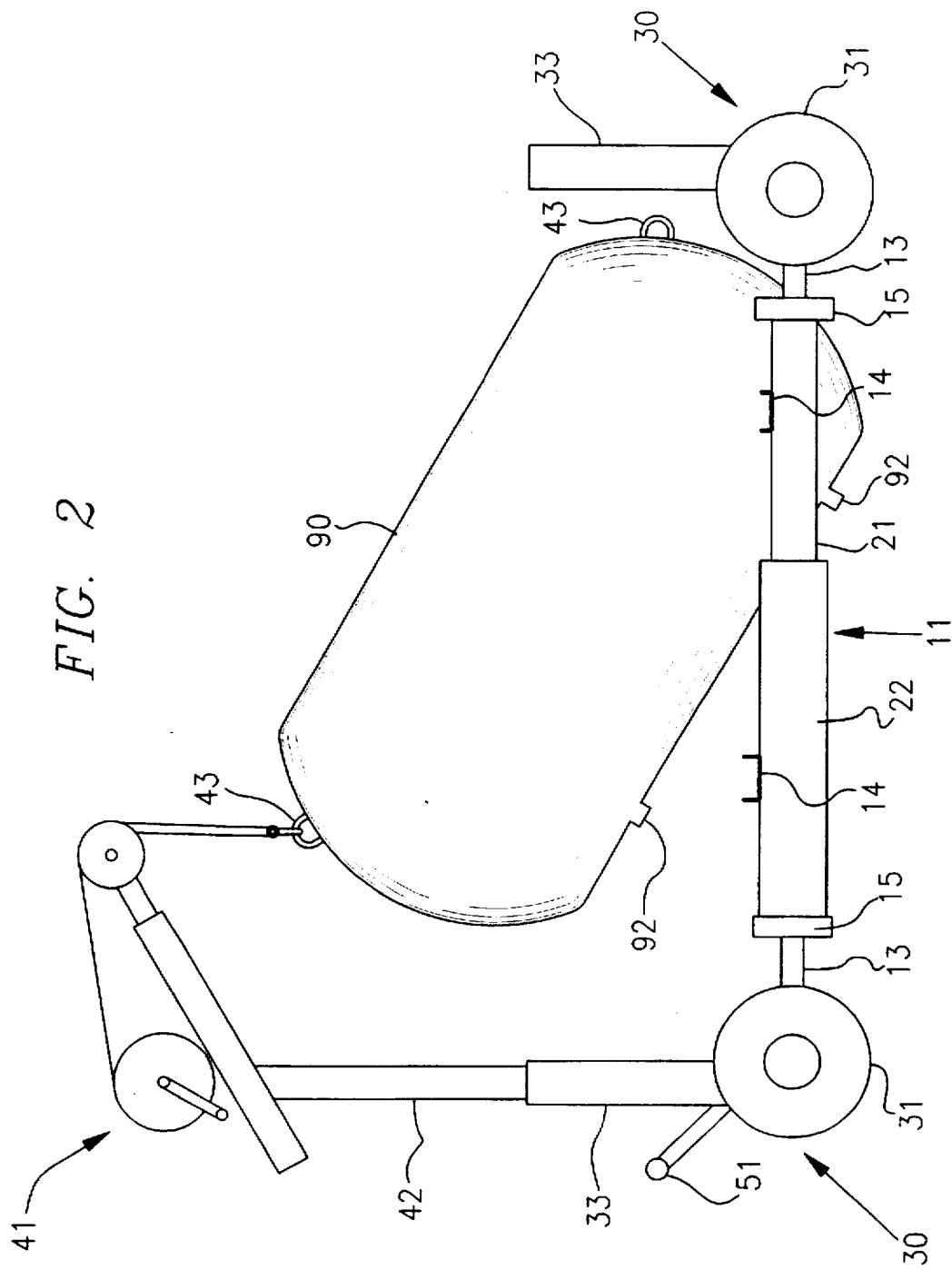
FIG. 2 is a side view of the invention, showing a tank in the half raised position.

The advantages of the described construction can be seen in FIGS. 2 and 3. The frame 10 can be constructed in place around the tank 90, such that a rigid rectangular configuration encircling the tank 90 is effected after longitudinal frame members 11 are joined to lateral frame members 12. To accomplish this the end members 30 are positioned at either end of tank 90 and lateral frame members 12 extended or retracted to the desired length, or extender members 61 are added. If the tank 90 being relocated is to be lowered into an excavated location, or if the tank 90 is being removed from an excavated location, the lateral frame members 12 are extended such that the longitudinal frame members 11 will be separated a distance greater than the width of the tank 90, thus allowing the tank 90 to be lowered or raised through the rectangular opening in frame 10. The longitudinal frame members 11 are then extended or retracted to the correct distance for mounting them onto the connector means 15 on lateral frame members 12. Once the frame 10 is assembled, the winch 41 is mounted to an end member 30 and the cable and hook 44 attached to a tank lift attachment means 91. One end of the tank 90 is then raised to a point where the foot 92 is above the height of the frame 10, or if no foot 92 is present, a portion of the bottom of the tank 90 has cleared the frame 10, as shown in FIG. 2. A support cross member 14 is then properly positioned across the two longitudinal frame members 11 and the tank 90 is lowered onto the support cross member 14. The cable and hook 44 is then detached from the tank 90 and the winch 41 is removed from the first end member 30 and mounted onto the opposite end member 30. The cable and hook 44 is attached to the other tank lift attachment means 91 and the other end of the tank 90 raised. The second support cross member 14 is placed between the two longitudinal cross members 11 and the tank 90 is lowered into position for transport, as shown in FIG. 3. If the tank 90 is to be raised from or lowered into a relatively deep excavation, then two winches 41 will most likely be required. To lower the tank 90 after it has been relocated, the steps are reversed. One end of the tank 90 is raised, the support cross member 14 is removed and the first end of the tank 90 is lowered to the ground. The winch 41 is removed from the first end member 30 and secured onto the second end member 30. The second end of the tank 90 is raised, the other cross member 14 removed and the second end is lowered to the ground. The apparatus frame 10 is then disassembled from around the tank 90 by removing the longitudinal frame members 11 from the lateral frame members 12.

It is understood that substitutions and equivalents for certain elements may be apparent to those skilled in the art, and the true scope and definition of the invention therefore is to be as set forth in the following claims.

I claim:

1. A lift and transport apparatus for use with storage tanks, the apparatus comprising a pair of extendable end members each comprising wheels attached to a brace member, winch mounting means attached to said brace member to releasably receive a winch, and a lateral frame member comprising an outer sleeve member attached to said brace member and a pair of inner sliding members positioned within said outer sleeve member, each of said pair of inner sliding members having a connector means to connect with connector means of one of a pair of extendable longitudinal frame members, a pair of extendable longitudinal frame members having connector means, where each of said pair of longitudinal frame members comprises an inner sliding member positioned within an outer sliding member and where each of said pair of longitudinal frame members is releasably attached to said connector means of said lateral frame members to form a generally rectangular frame, a pair of removable support cross members, each of said pair of support cross members positioned atop and extending across both of said longitudinal members of said pair of longitudinal frame members, and a single winch to raise and lower a storage tank between and above said pair of longitudinal frame members when said support cross members are removed, said winch releasably mounted within one of said winch mounting means.

2. The apparatus of claim 1, where each of said connector means comprises a combination of a pin and sleeve.

3. The apparatus of claim 1, further comprising handle means mountable to either of said end members.

4. The apparatus of claim 1, where said wheels are attached to said brace members by castor mount means.

5. A lift and transport apparatus for use with storage tanks, the apparatus comprising a pair of end members each comprising wheels attached to a brace member, winch mounting means attached to said brace member to releasably receive a winch, and a lateral frame member attached to said brace member, said lateral frame member having connector means to releasably connect said lateral frame member to a pair of longitudinal frame members each having connector means, said connector means comprising an extender member comprising a brace member releasably connected between said lateral frame member and one of said pair of longitudinal frame members, a pair of removable support cross members, each of said pair of support cross members positioned atop and extending across both of said longitudinal members of said pair of longitudinal frame members, and a single winch to raise and lower a storage tank between and above said pair of longitudinal frame members when said support cross members are removed, said winch releasably mounted within one of said winch mounting means.

6. The apparatus of claim 5, where each of said connector means comprise a pin mounted on said lateral frame member, a sleeve mounted on one of said pairs of longitudinal frame members, and a pin and sleeve mounted on said brace member of said extender member, where said pin of said extender member is connected to said sleeve of said longitudinal frame member and said sleeve of said extender member is connected to said pin of said lateral frame member.

7. The apparatus of claim 6, where said pins and said sleeves are non-circular in cross-section.

8. The apparatus of claim 5, where each of said connector means comprise a sleeve mounted on said lateral frame member, a pin mounted on one of said pairs of longitudinal frame members, and a pin and sleeve mounted on said brace member of said extender member, where said sleeve of said extender member is connected to said pin of said longitudinal frame member and said pin of said extender member is connected to said sleeve of said lateral frame member.

9. The apparatus of claim 8, where said pins and said sleeves are non-circular in cross-section.

10. The apparatus of claim 5, where each of said lateral frame members and each of said pair of longitudinal frame members are extendable and comprise an inner sleeve member positioned within an outer sleeve member.

* * * * *